United States Patent [19]

Wienkenhöver et al.

[11] Patent Number: 4,909,853

[45] Date of Patent: Mar. 20, 1990

[54] PIGMENT PREPARATIONS

[75] Inventors: Martin Wienkenhöver, Leverkusen; Volker Paulat, Monheim; Wolfgang Karnath, Langenfeld; Hans Schulze, Cologne; Karlheinz Wolf; Karl-Heinz Wieser, both of Leverkusen, all of Fed. Rep. of Germany

[73] Assignee: Bayer Aktiengesellschaft, Leverkusen, Fed. Rep. of Germany

[21] Appl. No.: 162,530

[22] Filed: Mar. 1, 1988

[30] Foreign Application Priority Data

Mar. 19, 1987 [DE] Fed. Rep. of Germany ....... 3708904

[51] Int. Cl.$^4$ .......................... C08J 3/02; C09C 1/56
[52] U.S. Cl. .................... 106/503; 106/473; 106/473
[58] Field of Search ............... 106/288 Q, 309, 503, 106/473, 493

[56] References Cited

U.S. PATENT DOCUMENTS 3,865,605  2/1975  Spietschka et al. ............... 106/503
4,107,126  8/1978  Burke, Jr. et al. ............. 106/308 M
4,127,420  11/1978  Harris et al. .................. 106/288 Q
4,277,288  7/1981  Lawrence et al. ................. 106/309

OTHER PUBLICATIONS

Derwent Abstract, An 84-072532/12, "Quinacridone Pigment Purification", Japanese Patent, J59027959, 2/14/84.
Derwent Abstract, An 85-149026/25, "Mfg. Coloured Silica Gel Microspheres", Japanese Patent, J60081012, 5/9/85.

Primary Examiner—Paul Lieberman
Assistant Examiner—Christine A. Skane
Attorney, Agent, or Firm—Sprung Horn Kramer & Woods

[57] ABSTRACT

Pigment preparations which contain an organic pigment and/or carbon black and a surfactant from the sulphosuccinic acid ester and/or alkylbenzenesulphonate series and which have been dried, if appropriate after wet comminution, by spray- or freeze-drying from an aqueous medium, and the use of these preparations for pigmenting high molecular weight organic material, in particular thermoplastics.

10 Claims, No Drawings

PIGMENT PREPARATIONS

The invention relates to preparations of organic pigments and/or carbon black and processes for pigmenting high molecular weight organic material, in particular thermoplastics, using these pigment preparations.

In addition to masterbatch preparations and liquid pigment preparations, powdered pigments are in many cases used for pigmenting thermoplastics.

Masterbatch and liquid pigment preparations have the disadvantage that broad applicability is limited by the carrier material. Different preparations with compatible carrier materials must therefore in each case be provided for the various thermoplastics.

Powdered pigments are widely used in pigmenting thermoplastics. The disadvantage in the use of powdered pigments is their not always optimum dispersibility in thermoplastics.

Various processes have been described in the literature for improving the dispersibility of pigments.

As well as the known resination of pigments, for example commercially available pigments of the C.I. Pigment Red 177 type (see, for example, DE-OS (German Published Specification) No. 2,653,434 and DE-OS (German Published Specification) No. 2,540,355), various other methods have been described.

Thus, for example, U.S. Pat. No. 3,133,893 describes the polymer coating of pigments; pigment concentrates in phosphoric acid esters are known from British Patent Specification No. 924,584. Liquid preparations, for example in esters of polybasic organic acids and mono- or polyhydric alcohols, have also been described (see, for example, Japanese Patent No. 58/149,311). There are also a number of special processes for improving the technological properties, in particular the dispersibility, of individual groups of pigments (see, for example, U.S. Pat. No. 3,156,575, DE-OS (German Published Specification) No. 2,323,580, European Patent No. A1-0,042,819 and DE-OS (German Published Specification) No. 2,919,519). However, general processes for improving the dispersibility of pigments, for example by making into a paste with acid in the presence of sulphonic acid or salts thereof (DE-OS (German Published Specification) No. 2,209,040) and, for example, the special drying process above the critical temperature (German Patent No. A1-3,009,603) are also known.

Surprisingly, it has now been found that pigment preparations which contain an organic pigment and/or carbon black and a surfactant from the sulphosuccinic acid ester and/or alkylbenzenesulphonate series and have been dried, if appropriate after wet comminution, by spray- or freeze-drying from an aqueous medium have excellent dispersibility in high molecular weight organic material, in particular in thermoplastics. In particular, compared with the known preparations, the pigment preparations according to the invention are distinguished by broad applicability in various thermoplastics.

Organic pigments of all classes of pigments can in principle be used in the pigment preparations according to the invention. Those pigments which are suitable for colouring high molecular weight organic material, in particular thermoplastics, are especially useable. Such pigments are known, for example, from the book "Einfarben von Kunststoffen" ("Colouring Plastics"), publisher: Verein Deutscher Ingenieure, VDI-Gesellschaft Kunststoff-technik, VDI-Verlag GmbH, Düsseldorf 1975 (ISBN 3-18-404014-3), pages 203-224 and the bibliography given with this article.

The following types of pigment are particularly suitable as constituents of the preparations according to the invention:

(A) Azo pigments and azo pigment lakes, for example pigments of the monoazo series, acetoacetic acid ester derivatives, derivatives of 2,3-oxynaphthoic acid, 2,3-oxynaphthoic acid arylamide derivatives, pigments of the disazo series, derivatives of 3, 3-dichlorobenzidine, diaryl yellow types and condensed disazo pigments; metal complex pigments; anthraquinoid pigments; phthalocyanine pigments; and polycyclic pigments, in particular those of the anthanthrone, thioindigo, quinacridone, dioxazine, pyrrolopyrrole, naphthalenetetracarboxyl acid, perylene, isoindolin(on)e, flavanthrone, pyranthrone or isoviolanthrone series.

Pigments which are preferably employed are: azo pigments and azo pigment lakes, for example of the formula

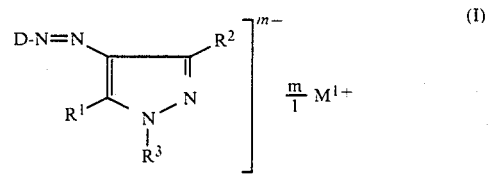

in which
D designates

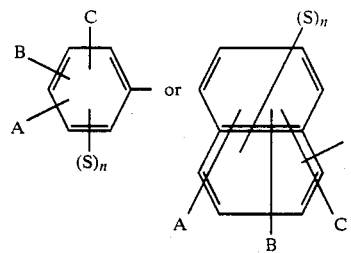

$R^1$ designates —OH or —$NR^4R^5$,
$R^2$ designates

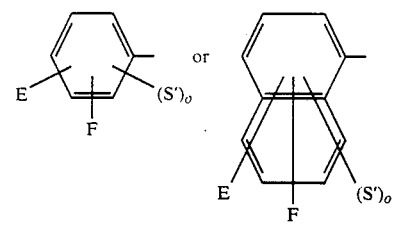

and, in the case where $R^1$=—$NR^4R^5$, also H, carboxylate or alkyl, in particular methyl,
$R^3$ designates

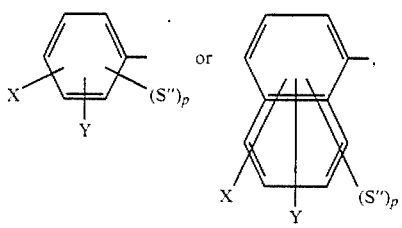

$R^4$ and $R^5$ designate H, alkyl, cycloalkyl, aralkyl or aryl, it being possible for the hydrocarbon radicals mentioned to be substituted, S, S′ and S″ designate carboxylate or sulphonate, A, B, C, E, F, X and Y designate H, —CF$_3$, halogen, —NO$_2$, —CN, $R^6$, —OR$^6$, —NR$^6$R$^7$, —NH$_2$, —SO$_2$NH$_2$—SO$_2$NR$^6$R$^7$, —CONH$_2$, —CONR$^6$R$^7$ or —NHCOR$^6$, M designates ammonium or a metal, n, o and p designate 0, 1 or 2, m designates n+o+p or, in the case where $R^2$=—COOH, n+o+p+1, with the condition that $1 \leqq m \leqq 3$, and preferably m designates 2, 1 designates the valency of M and $R^6$ and $R^7$ designate alkyl, cycloalkyl, aralkyl or aryl, it being possible for the hydrocarbon radicals mentioned to be substituted, for example the azo colour lake of the formula

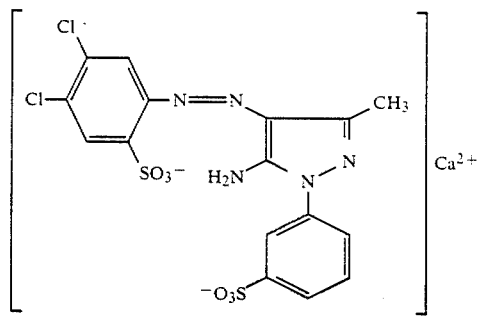

To prepare pigments of the formula I, amines of the formula

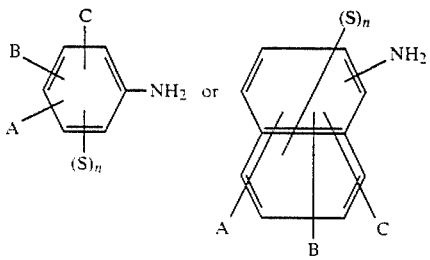

can be diazotized, the diazotization products can be coupled with compounds of the formula

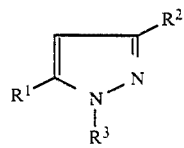

and the dyestuffs can be converted into the desired metal salts.

(B) Pigments of the quinacridone series, for example unsubstituted quinacridone or quinacridone which is substituted by —CH$_3$, Cl or —CONH$_2$, and mixtures of different auinacridones (solid solutions). C.I. Pigment Red 122 may be mentioned as an example.

(C) Pigments of the perylene series, for example N,N-dialkyl-, preferably -dimethyl-, or N,N-diphenyl-substituted perylene-3,4,9,10-tetracarboxylic acid diimide, it being possible for the phenyl radicals to be substituted by —CH$_3$, —OCH3, —OC2H5, Cl or

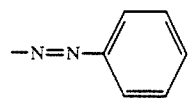

Pigment Red 149 may be mentioned as an example.

(D) Azobarbituric acid pigments, in particular salts or complexes of azobarbituric acid, in particular the azobarbituric acid-nickel 1:1 complex, which contain other enclosed compounds. These compounds are known, for example, from European Patent No. A1-0,073,463 and European Patent No. A1-0,074,515.

(E) Anthraquinoid pigments, for example C.I. Pigment Red 177 and the pigment of the formula

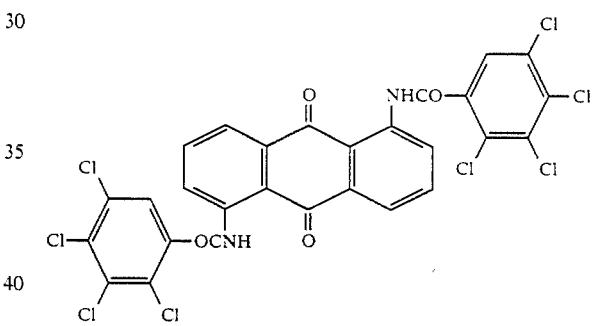

(F) Metal complex pigments (G) Isoindolin(on)e pigments, for example the pigment of the formula

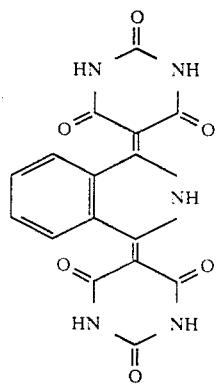

(H) Phthalocyanine pigments, in particular copper phthalocyanine pigments, for example C.I. Pigment Blue 15, 15:1, 15:2, 15:3 and 15:4 and C.I. Pigment Green 7.

The preparations according to the invention preferably contain, based on the weight of (I)+(II), (I) 80–99% by weight, particularly preferably 90-98% by weight, of organic pigment and/or carbon black and (II) 20-1% by weight, particularly preferably 10-2% by weight, and especially preferably 2-6% by weight, of surfactant from the sulphosuccinic acid ester and/or alkylbenzenesulphonate series.

The pigment preparations can additionally also contain customary additives, such as extenders, for example barium sulphate, surface-coating agents, for example oils, resins and other surfactants, for example condensation products obtained from naphthalene an formaldehyde in the presence of sulphuric acid.

The sulphosuccinic acid esters used preferably correspond to the formula

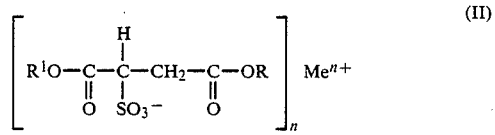

in which

R and $R^1$ represent hydrogen or a $C_1$–$C_{24}$-hydrocarbon radical, but R and $R^1$ do not simultaneously denote hydrogen, n designates 1 or 2 and Me, for n=1, represents hydrogen, an ammonium radical or an alkali metal and, for n=2, represents an alkaline earth metal.

R and $R^1$ preferably represent a $C_1$–$C_{24}$-, in particular a $C_6$–$C_{18}$-alkyl, -aryl or -aralkyl radical; the 2-ethylhexyl radical is particularly important.

Compounds of the formula II where $R = R^1$ are furthermore preferred. Me particularly represents H, Li, K, Mg, Ca or Ba, and particularly preferably Na.

The alkylbenzenesulphonates used preferably correspond to the formula III

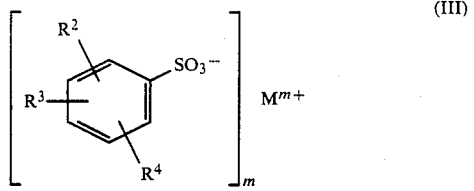

in which $R^2$, $R^3$ and $R^4$ represent hydrogen or a $C_1$–$C_{24}$alkyl radical, at least one of the substituents $R^2$, $R^3$ and $R^4$ being hydrogen, m designates 1 or 2 and M, for n=1, represents hydrogen, an ammonium radical or an alkali metal, and for m=2, represents an alkaline earth metal.

$R^2$, $R^3$ and $R^4$ preferably represent, in addition to hydrogen, a $C_6$–$C_{18}$-alkyl radical, alkylbenzenesulphonates where $R^2 = R^3 = H$ and $R^4 = C_1$–$C_{24}$-alkyl or $C_6$–$C_{18}$-alkyl being of particular interest; the dodecyl radical is particularly important.

M particularly represents H, Li, Na, K, Mg, Ca or Ba, and particularly preferably an ammonium radical, forexample monoethanol-, diethanol- and triethanolammonium.

The comminution to be carried out if appropriate can take place in customary wet comminution apparatus, such as corundum disc and/or bead mills, after liquefaction of a pigment presscake with the abovementioned surfactants and water or by making a paste of the dry pigment, surfactant and water.

The preparations are dried by spray-drying, in particular powder or granule spray-drying, or freeze-drying.

The preparations according to the invention are suitable for pigmenting high molecular weight organic material, in particular thermoplastics, such as polyolefines, for example low and high density polyethylene, and polypropylene, polyamides, linear polyesters, polyurethanes, polystyrene, polyvinyl chloride, polycarbonate and acrylonitrile/butadienestyrene copolymer. The pigment preparations are incorporated into the plastics by customary processes, such as are described, for example, in the book "Einfärben von Kunststoffen"('-'Colouring Plastics"), publisher: Vereein Deutscher Ingenieure, VDI-Gesellschaft Kunststofftechnik, VDI-Verlag GmbH, Düusseldorf 1975 (ISBN 3-18-4040-14-3), in particular pages 241-390.

EXAMPLE 1

13.3 g of the Na salt of bis-(2-ethylhexyl) sulphosuccinate are dissolved in 126.7 g of demineralized water at a temperature of 70° C. After cooling, this solution is added to 860 g of a 31% strength presscake of 2,9-dimethylquinacridone (C.I. Pigment Red 122) which has been formed by the customary route (making into a paste with acid and heating), and the mixture is homogenized by means of a high-speed stirrer.

A dispersion with a total solids content of 28% and a dispersing agent content of 5%, based on the pigment, results. After comminution in a corundum disc mill, this dispersion is dried to a residual moisture of <0.5% in a laboratory spray drier.

| | |
|---|---|
| Air intake temperature: | 180° C. |
| Air outlet temperature: | 80° C. |
| Air throughput: | 250 m³/hour |
| Water vaporization capacity: | 8 kg/hour |
| Technique: | two-component nozzle |
| Colouring thermoplastics | |

(a) PVC-P: transparent coloration 0.1 part of red pigment preparation prepared according to the above instructions is intimately mixed with 100 parts of PVC-compound of the composition:
70 parts of vinyl chloride homopolymer,
30 parts of diisooctyl phthalate,
3 parts of stabilizer mixer and
1 part of chelator, in a slow-running laboratory mixing device. The mixed material is discharged onto a running laboratory roll mill in the course of two minutes.

| Conditions | |
|---|---|
| Friction | 1:1.1 to 1:1.2 |
| Roll nip | 0.4 to 0.5 mm |
| Roll temperature | 160 ± 5° C. |
| Milling duration | 5 to 10 minutes |

The mixed material of red pigment preparation and PVC compound is homogenized and taken off as a hide. Red transparent colorations with excellent light stability are obtained.

(b) PVC-P: oDaoue coloration 0.1 part of red pigment preparation prepared according to the above instructions is mixed, together with 1.0 part of titanium dioxide (rutile type), in the same PVC compound as in Example (a) and the mixture is homogenized at 160° C. The fell taken off from the laboratory roll mill has an opaque red colour shade. The colorations are particularly stable to migration and have very high light-fastnesses.

(c) HD-PE and PP: transparent and opaque coloration 100 parts of commercially available polyethylene granules (HD-PE with a high density, relatively low molecular weight and melt flow index MFI of 190/2, procedure 4=7 g/10 minutes, or a melt flow index of 190/5, procedure 5=20 g/10 minutes in accordance with DIN 53 735 and/or ISO/R 1133) are mixed with 0.2 part of red pigment preparation, prepared according to the above instructions, in a slow-running mixing drum for 5 minutes. The granules thus coloured are homogenized via a single-screw extruder at 170° C. and taken off as flat ribbons. The resulting ribbon is granulated and the granules are injection-moulded on a screw injection moulding machine at temperatures above 200° C. to give coloured sample sheets. If the material temperature of the coloured PE composition is increased from 200° C. to 300° C., no change in the colour shade can be detected between 200° C. and 300° C. Brilliant red colorations with an excellently high resistance to heat are obtained.

The same reslts are achieved in opaque colorations with $TiO_{02}$ (rutile type) in HD-PE and also in crystalline polypropylene (transparent and opaque).

(d) PS and SB 0.1 part of red pigment preparation, prepared according to the above instructions, and 0.5 par of $TiO_2$ (rutile type) are mixed with 100 parts of polystyrene granules (standard polystyrene of K value 64 and density 1.05 g/cm$^3$) in a polyethylene bottle on a castor for 10 minutes. The granules thus coloured are injection-moulded directly on a screw injection moulding machine using an increased dynamic pressure to give mouldings. Mouldings with a brilliant red shade and uniform distributon of the pigment are obtained. The pigment preparation can be dispersed easily and well.

Instead of PS, a polystyrene modified with butadiene (SB) can be used.

(e) ABS 0.5 part of red pigment preparation prepared according to the above instructions is mixed, in combination with 4 parts of $TiO_2$ (rutile type), with 100 parts of ABS powder compound (ABS=acrylonitrile/butadiene/styrene copolymer). The ABS compound contains the usual stabilizers, antioxidants and lubricants. The ABS-pigment mixture is plasticized and homogenized in an internal mixer with a floating weight at 180° C. for three minutes. The hot thermoplastic composition is discharged onto a roll mill and granulated by customary methods.

On processing to mouldings on screw injection moulding machines, the coloured granules have a red luminous colour shade.

No changes in colour shade can be detected at processing temperatures of 220° C. and 280° C. and with long residence times.

The red pigment preparation has an excellent resistance to heat.

Equally good results are achieved in blends of plastics with the composition ABS/polycarbonate.

(f) PC and PC/PBT 0.2 part of red pigment preparation prepared according to the above instructions is mixed in the dry state with a commercially available polycarbonate (melt flow index of MFI 300° C./1.2 kg loading in accordance with DIN 53 735 and/or ISO/R 1133=19 g/10 minutes) in the form of granules. The granules thus coloured are melted on a twin-screw extruder at 290° C. and the pigment preparation is dispersed. The homogeneously coloured PC is discharged via an extrusion die and granulated to uniform particles on a cutting mill.

The granules can be processed by the customary methods of the injection moulding process to give sample mouldings or finished mouldings.

No changes in colour shade can be detected at injection moulding temperatures of 290° C. to 320° C. and with residence times of 5 minutes. The pigment preparation is resistant to heat from 290° to 320° C.

Instead of pure PC, a mixture (polymer blend) with polybutylene terephthalate can be used.

EXAMPLE 2

14.3 g of the Na salt of bis-(2-ethylhexyl) sulphosuccinate are dissolved in 169.7 g of demineralized waer at a temperature of 70° C. After cooling, this solution is added to 816 g of a 35% strength presscake of the pigment of the following structure:

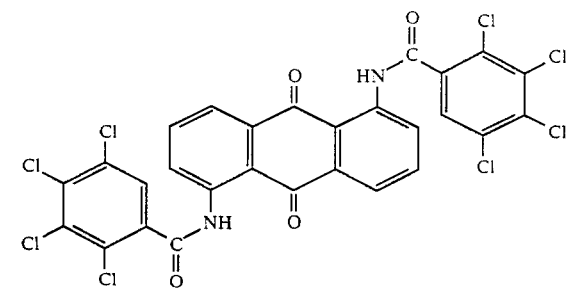

and the mixture is homogenized by means of a high-speed stirrer. The 30% strength dispersion thus obtained is comminuted and spray-dried as described in Example 1. A pigment powder with a very good dispersibility in thermoplastics such as PVC-P, HD-PE and PP results (see Example 1a, b and c).

EXAMPLE 3

2.86 kg of the Na salt of bis-(2-ethylhexyl) sulphosuccinate are dissolved in 33.94 kg of demineralized water at a temperature of 70° C. After cooling, this solution is placed in a striking vessel and 163.3 kg of the 35% strength presscake of the pigment described in Example 2 are added. After homogenization and comminution analogously to Example 1, the mixture is dried to a residual moisture of <0.4% in a pilot plant spray drier.

| | |
|---|---|
| Air intake temperature: | 180° C. |
| Air outlet temperature: | 80° C. |
| Air throughput: | 1.500 m$^3$/hour |
| Water vaporization capacity: | 70 kg/hour |

| -continued | |
|---|---|
| Technique: | one-component nozzle |

Free-flowing pigment granules which have a low dust content and are very readily dispersible in thermoplastics such as PVC-P, HD-PE and PP are thus obtained (coloration of the thermoplastics analogously to Example 1a, b and c).

EXAMPLE 4

8.1 g of the Na salt of bis-(2-ethylhexyl) sulphosuccinate are dissolved in 256 g of demineralized water at a temperature of 70° C. After cooling, 735.9 g of a 22% strength presscake of an intercalation compound of Pigment Yellow 150 are added and the mixture is homogenized and comminuted analogously to Example 1. Pigment Yellow 150 is an Ni-azobarbituric acid 1:1 complex of the formula

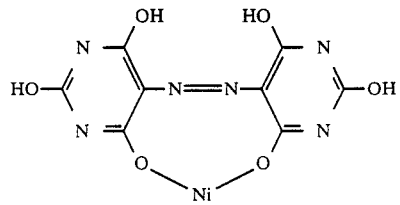

The intercalation compound was prepared from the above pigment according to European Patent No. A1-73,463, Example 1. The resulting dispersion with a total solids content of 17% contains, based on the intercalation compound employed, 5% of the dispersing agent. The dispersion is spray-dried to a residual moisture of <0.5% as described in Example 1. The pigment powder is very readily dispersible in the thermoplastics PVC, PE and PP (for the colouring instructions, ssee Example 1a, b and c).

EXAMPLE 5

13.3 g of the monoethanolammonium salt of dodecylbenzenesulphonic acid are dissolved in 126.7 g of demineralized water at a temperature of 50° C. After cooling, 860 g of a 31% strength presscake of C.I. Pigment Red 122 (see Example 1) are introduced into this solution and the mixture is homogenized, comminuted and spray-dried as described in Example 1. The product thus obtained is very readily dispersible in the thermoplastics PVC-P, HD-PE, PP, PS, SB, ABS and PC (for the incorporation into the thermoplastics, see Example 1a to f).

EXAMPLE 6

Instead of the monoethanolammonium salt of dodecylbenzenesulphonic acid in Example 5, 13.3 g of the diethanolammonium salt of dodecylbenzenesulphonic acid are used. A product with comparable properties is obtained.

EXAMPLE 7

Instead of the monoethanolammonium salt of dodecylbenzenesulphonic acid in Example 5, 13.3 g of the triethanolammonium salt of dodecylbenzenesulphonic acid are used. The resulting product has comparable properties.

EXAMPLE 8

Instead of the 13.3 g of the Na salt of bis-(2-ethylhexyl) sulphosuccinate as described in Example 1, 13.3 g of a mixture of the following components in a ratio of 1:1 are used: Na salt of bis-(2-ethylhexyl) sulphosuccinate and diethanolammonium salt of dodecylbenzenesulphonic acid. A product with properties comparable to those described in Example 1 results.

EXAMPLE 9

7.2 g of the Na salt of bis-(2-ethylhexyl) sulphosuccinate are dissolved in 635.8 g of demineralized ater at 70° C. After cooling, this solution is added to 357 g of a 40% strength presscake of the pigment with the formula

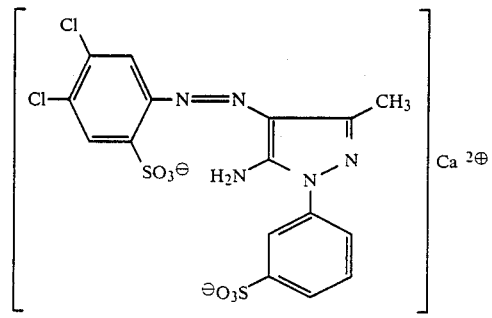

After homogenization by means of a high-speed stirrer, a dispersion with a total solids content of 15% which, based on the pigment, contains 5% of the dispersing agent is formed. Comminution and spray-drying as described in Example 1 give a yellow pigment powder which is very readily dispersible in the thermoplastics PVC, PE, PC, PS, SB and ABS (see the colouring instructions in Example 1a to f).

EXAMPLE 10

9.5 g of the Na salt of bis-(2-ethylhexyl) sulphosuccinate are dissolved in 446.2 g of demineralized water at a temperature of 70° C. After cooling, this solution is added to 544.3 g of a 35% strength presscake of C.I. Pigment Red 149. After homogenization and comminution as described in Example 1, a dispersion with a total solids content of 20% which, based on the pigment, contains 5% of dispersing agent is formed. After spray-drying (analogously to Example 1), a red pigment powder which is very readily dispersible in PVC and PE is obtained (for the colouring instuctions, see Example 1a to c).

We claim:

1. Pigment preparations consisting essentially of an organic pigment and/or carbon black and a surfactant selected from the group consisting of sulphosuccinic acid ester series, alkylbenzenesulphonate series and mixtures thereof, which have been dried, after wet comminution, by spray- or freeze-drying from an aqueous medium.

2. Pigment preparations according to claim 1 wherein the surfactant is a sulphosuccinic acid ester of the formula

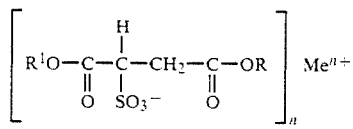

in which

R and R¹ represent hydrogen or a $C_1$–$C_{24}$-hydrocarbon radical, but R and R¹ do not simultaneously denote hydrogen, n designates 1 or 2 and Me, for n=1, represents an ammonium radical or an alkali metal and, for n=2, represents an alkaline earth metal.

3. Pigment preparations according to claim 1, wherein the surfactant is a bis-(2-ethylhexyl) sulphosuccinate.

4. Pigment preparations according to claim 1, wherein the surfactant is an alkylbenzenesulphonate of the formula

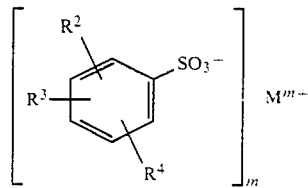

in which

R², R³ and R⁴ represent hydrogen or a $C_1$–$C_{24}$- alkyl radical, at least one of the substituents R², R³ and R⁴ not being hydrogen and m designates 1 or 2 and M, for n=1, represents hydrogen, an ammonium radial or an alkali metal, and for m=2, represents an alkaline earth metal.

5. Pigment preparations according to claim 1 wherein the surfactant is a dodecylbenzenesulphonate.

6. Pigment preparation according to claim 1, wherein the pigment, an azo pigment is an azo pigment lake, a metal complex pigment, an anthraquinoid pigment, a phthalocyanine pigment or a polycyclic pigment.

7. Pigment preparations according to claim 1, consisting essentially of
 (I) 80–99% by weight of organic pigment and/or carbon black; and
 (II) 20–1% by weight of surfactant.

8. A pigmented high molecular weight material comprising a high molecular weight material and a pigment preparation according to claim 1.

9. A pigmented high molecular weight material accoding to claim 8 wherein the high molecular weight material is a thermoplastic.

10. Pigment preparations according to claim 1, consisting essentially of
 (I) 90–98% by weight of organic pigment and/or carbon black; and
 (II) 10–2% by weight of surfactant.

* * * * *